United States Patent
Denneler et al.

(10) Patent No.: US 10,419,299 B2
(45) Date of Patent: Sep. 17, 2019

(54) SPATIAL REPRESENTATION OF NETWORK ELEMENTS

(71) Applicant: ARRIS Enterprises LLC, Suwanee, GA (US)

(72) Inventors: Charles Ross Denneler, Lawrence, KS (US); Brendon Milton Allen, Lawrence, KS (US)

(73) Assignee: ARRIS Enterprises LLC, Suwanee, GA (US)

( * ) Notice: Subject to any disclaimer, the term of this patent is extended or adjusted under 35 U.S.C. 154(b) by 133 days.

(21) Appl. No.: 15/419,455

(22) Filed: Jan. 30, 2017

(65) Prior Publication Data
US 2017/0222884 A1 Aug. 3, 2017

Related U.S. Application Data

(60) Provisional application No. 62/288,645, filed on Jan. 29, 2016.

(51) Int. Cl.
*G06F 3/048* (2013.01)
*H04L 12/24* (2006.01)
*H04W 4/02* (2018.01)

(52) U.S. Cl.
CPC ............... *H04L 41/22* (2013.01); *H04W 4/02* (2013.01)

(58) Field of Classification Search
CPC ............... G06F 3/04847; H04L 12/281; H04L 12/2807; H04L 12/2803; H04L 12/2805; H04L 41/22
See application file for complete search history.

(56) References Cited

U.S. PATENT DOCUMENTS

| | | | | |
|---|---|---|---|---|
| 7,831,899 B2 * | 11/2010 | Humpleman | ....... | H04L 12/2805 709/217 |
| 8,042,048 B2 * | 10/2011 | Wilson | ................ | H04L 12/2807 715/736 |
| 8,671,099 B2 * | 3/2014 | Kapoor | ................... | H04W 4/70 707/738 |
| 9,575,472 B1 * | 2/2017 | Clayton | .................. | H04L 12/10 |
| 9,948,477 B2 * | 4/2018 | Marten | .................. | G05B 15/02 |
| 9,960,980 B2 * | 5/2018 | Wilson | .................. | H04W 4/029 |
| 9,967,614 B2 * | 5/2018 | Mccarthy, III | ... | H04N 21/43615 |
| 9,979,625 B2 * | 5/2018 | McLaughlin | ........... | H04W 4/70 |
| 9,983,011 B2 * | 5/2018 | Mountain | ............ | G01C 21/206 |
| 2003/0177271 A1 * | 9/2003 | Park | .................... | H04L 12/2803 709/246 |

(Continued)

*Primary Examiner* — David Phantana-angkool
(74) *Attorney, Agent, or Firm* — Bart A. Perkins

(57) ABSTRACT

Methods, systems, and computer readable media can be operable to facilitate the flexible relative placement of network elements within a spatial representation of network elements within a subscriber premise without requiring exact measurements, a complete floor plan, or exact tracking by a technician. Thus, the methods, systems, and computer readable media described herein provide for a quick generation of a layout without the need to draw detailed floor plans of a premise. An interface showing the layout of network elements within a subscriber premise may include an identification of the quality of wireless performance at each network element. A user may interface with, and monitor the network elements through the user interface displaying the spatial representation of the various network elements.

20 Claims, 11 Drawing Sheets

(56) References Cited

U.S. PATENT DOCUMENTS

| | | | |
|---|---|---|---|
| 2009/0066534 A1* | 3/2009 | Sivakkolundhu | H04L 12/281 340/4.32 |
| 2014/0068486 A1* | 3/2014 | Sellers | G06F 3/04847 715/771 |
| 2016/0210569 A1* | 7/2016 | Enck | G06Q 10/0637 |
| 2017/0156195 A1* | 6/2017 | Shepherd | H05B 35/00 |

* cited by examiner

006
SPATIAL REPRESENTATION OF NETWORK ELEMENTS

CROSS REFERENCE TO RELATED APPLICATION

This application is a non-provisional application claiming the benefit of U.S. Provisional Application Ser. No. 62/288,645, entitled "Home Network Layout and Automation Interface," which was filed on Jan. 29, 2016, and is incorporated herein by reference in its entirety.

TECHNICAL FIELD

This disclosure relates to the generation of and user interaction with a spatial representation of network elements.

BACKGROUND

Typically, multiple services (e.g., video, voice, data, etc.) are received at a subscriber premise by a customer premise equipment (CPE) device (e.g., gateway device), and the multiple services are provided to consumers over a local network (e.g., local area network (LAN), wireless local area network (WLAN), multimedia over coax alliance (MoCA) network, etc.). Devices connected to the local network may be configured to receive services offered by a service provider (e.g., multiple systems operator (MSO)) and may be configured to communicate with other devices connected to the local network.

The types of devices that may be connected to a local network continues to grow in number. For example, local network access is not limited to only multimedia devices (e.g., set-top boxes (STB), televisions, mobile devices, tablets, etc.), but is now available to a multitude of other home and personal devices (e.g., Internet of things (IoT) devices) such as appliances, wearables, home automation devices, and others.

There is a need for a tool to be used by subscribers and field technicians to verify and record wireless (e.g., Wi-Fi) coverage in a home/business or other premise when doing an install of the wireless or home network and any associated devices. One solution is to create a full coverage heat map, but this is difficult to achieve in a reasonable time frame. It also creates challenges related to reliably tracking the location of the technician in an indoor environment. Other solutions require that a complete floorplan or layout of a premise is created before determining the wireless coverage existing in the premise. What is needed is a simple way to visualize the whole home that is both easy to understand and quick to create. Therefore, it is desirable to provide a user interface through which a subscriber may view, manage, and interact with the plurality of devices connected to a local network.

BRIEF DESCRIPTION OF THE DRAWINGS

Like reference numbers and designations in the various drawings indicate like elements.

DETAILED DESCRIPTION

It is desirable to improve upon methods and systems for creating and using a layout of network elements within a subscriber premise. Described herein is a method, system, and computer readable media that allows for the flexible relative placement of network elements within a spatial representation of network elements within a subscriber premise without requiring exact measurements, a complete floor plan, or exact tracking by a technician. Thus, the methods, systems, and computer readable media described herein provide for a quick generation of a layout without the need to draw detailed floor plans of a premise. An interface showing the layout of network elements within a subscriber premise may include an identification of the quality of wireless performance (e.g., signal strength) at each network element. A user may interface with, and monitor the network elements through the user interface displaying the spatial representation of the various network elements.

Figure 1:
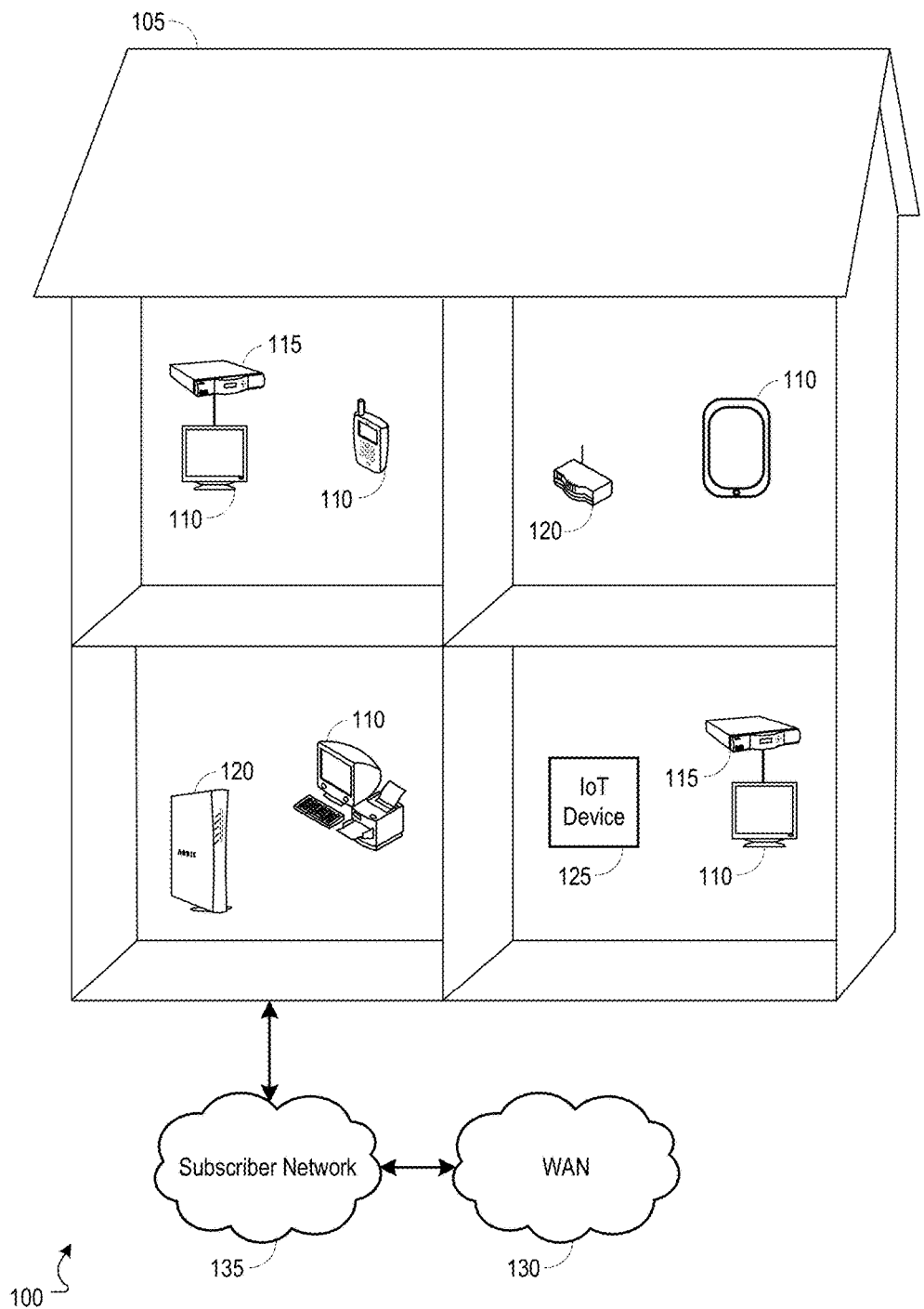
FIG. 1 is a block diagram illustrating an example network environment operable to facilitate the generation of, and user interaction with, a spatial representation of network elements.

FIG. 1 is a block diagram illustrating an example network environment 100 operable to facilitate the generation of, and user interaction with, a spatial representation of network elements. In embodiments, video, voice, and/or data services may be delivered to one or more network elements of a subscriber premise 105. Network elements may include client devices 110 such as televisions, mobile wireless devices (e.g., mobile telephone, tablet, etc.), computers, gaming consoles, wearable devices (e.g., smart watch, glasses, etc.), customer premise equipment (CPE) devices (e.g., set-top box (STB) 115, etc.), access points 120 (e.g., gateway devices, wireless routers, wireless network extenders, and/or any device configured to receive and/or deliver communications or services to one or more network elements), Internet of Things (IoT) devices 125 (e.g., appliances, security equipment, lights, doors, windows, and various other devices and sensors configured to communicate over a local-area network or via a near field communication (NFC)), and any other device operable to receive video, voice, and/or data services. It should be understood that various data, multimedia, and/or voice services may be delivered to the various network elements within the subscriber premise 105, including but not limited to, live or broadcast television, video-on-demand (VoD) content, pay-per view content, recorded content (e.g., DVR content), audio-only content, streaming content, and others. One or more local networks and wired and/or wireless communication techniques may be utilized to pass communications between the network elements of the subscriber premise 105.

Communications may be passed to and from network elements within the subscriber premise 105 over one or more local networks (e.g., coaxial network, a local area network (LAN), wireless local area network (WLAN), personal area network (PAN), Multimedia over Coax Alliance (MoCA) network, mobile hotspot network, and any other interconnectivity operable to route communications to and from the network elements), and delivery of the communications may be facilitated by one or more access points 120 and/or one or more wireless communication techniques (e.g., NFC, Bluetooth, Zigbee, etc.). It should be understood that one or more access points 120 may be integrated with each other or with other network elements, and that various network elements may operate as a station or an access point.

It should be understood that delivery of communications to and from the network elements of the subscriber premise 105 may be accomplished using a variety of standards and formats. It will be appreciated by those skilled in the relevant art that the network elements may be capable of interacting and communicating with each other over various wired and wireless communication standards (e.g., Wi-Fi, NFC, Bluetooth, Zigbee, etc.).

Multiple services may be provided to a subscriber premise 105 from a WAN 130 through a subscriber network 135. The subscriber network 135 may include, for example, a hybrid fiber-coaxial (HFC) network, fiber network, mobile network, and any other network operable to deliver services to a subscriber premise 105.

In embodiments, spatial relationships between network elements of the subscriber premise 105 may be added to and depicted within a grid. For example, a technician or user may place identifiers of various network elements within a grid that includes a scale indicating distances between objects within the grid. Spatial relationships between network elements may be added to a grid, edited within a grid, and depicted within a grid through a user interface that is provided by a network element. It should be understood that the network element through which a user creates, edits, and/or depicts a spatial representation of network elements within a subscriber premise 105 may be any network element capable of outputting a display to a user. For example, the network element through which a user creates, edits, and/or depicts a spatial representation of network elements within a subscriber premise 105 may be a STB, mobile device, tablet, computer, or other network element.

In embodiments, a user may request a user interface of a spatial representation of network elements through a network element (e.g., STB, mobile device, tablet, computer, etc.), and the network element may output the user interface to an associated display (e.g., television, display screen, etc.). The user may interface with the network elements shown in the user interface, add network element identifiers to the grid within the user interface, and/or edit the positions of network element identifiers within the grid using any of a variety of input devices or techniques (e.g., remote control unit (RCU), touchscreen, etc.).

In embodiments, a network element managing the spatial representation of network elements within the subscriber premise 105 may retrieve status information (e.g., power state, tuning state, content displayed, wireless capability/availability, etc.) associated with the network elements included within the spatial representation. For example, the managing network element may periodically request state information from each of the network elements included within the spatial representation, or the managing network element may receive status updates from a network element when the network element experiences a power state change (e.g., powers up or down) or when the network element otherwise reports a status update or notification. It will be appreciated by those skilled in the relevant art that the managing network element may use various communication techniques and methods to maintain a current list of network elements included within the spatial representation and corresponding status information.

In embodiments, through the user interface, a user may associate certain identification information with each network element included within the spatial representation. The user interface may provide certain identifier features for selection by a user when adding or editing a network element within the spatial representation. For example, a network element identifier may be displayed within a spatial representation grid as an icon, and the icon may include various identifier features (e.g., text, background colors, and other features that serve to describe or suggest the identity, functionality, and/or status of the corresponding network element) selected by a user. Each network element may be displayed in the spatial representation grid as an object, and each object can include various components serving to describe the identity, functionality, status, and/or other characteristics of the network element. The object may include an icon associated with the type of network element (e.g., gateway, set-top box (STB), gaming device, mobile device, IoT device, etc.). The object may include text describing the type of network element, an identifier or name of the network element (e.g., a name assigned to the device by a user/owner), a user associated with the network element, and/or other characteristics. The object may include a background associated with the status of the network element. For example, the background may be colored according to whether the network element is active/inactive, connected/disconnected, on/off, wirelessly enabled/disabled, or according to other status information.

In embodiments, the managing network element (e.g., a network element managing the spatial representation of network elements within the subscriber premise 105) may retrieve or may take measurements of performance at one or more network elements. For example, the managing network element may retrieve or may measure wireless bandwidth at one or more network elements. When measuring the performance of a network element, multiple samples may be taken at a location to provide a more comprehensive assessment of the quality of a wireless service. In embodiments, a small heat map may be generated for individual rooms (e.g., a technician or user may walk around the perimeter of a room and mark each corner). Measuring performance of a network element may include testing the real wireless bandwidth from a device to an access point.

A user may place one or more network element identifiers at user-selected positions within a grid to create a spatial relationship layout without needing a full floor plan of a subscriber premise. The user interface provides for easy visualization of coverage and performance of network elements located within a subscribe premise 105.

Figure 2:
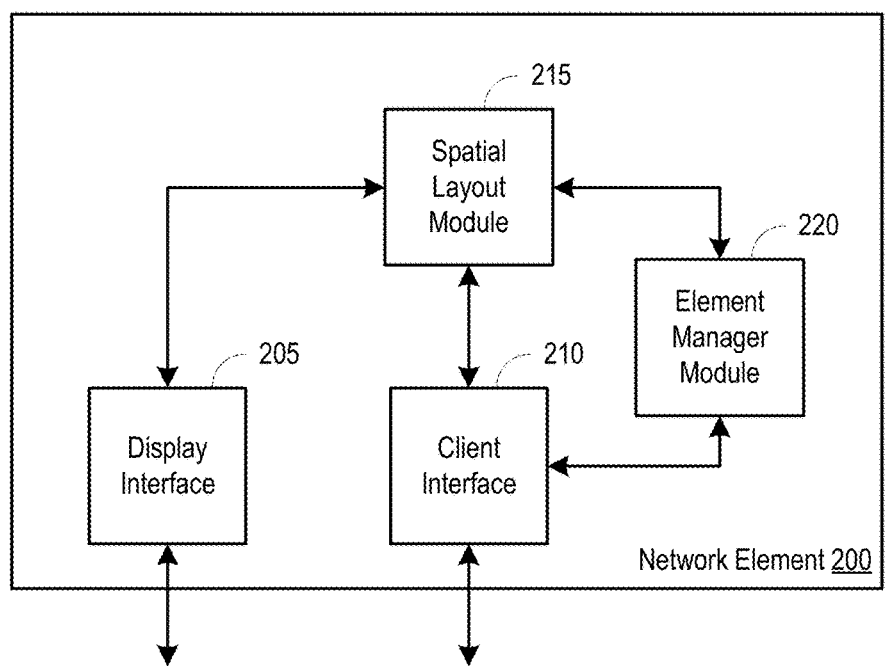
FIG. 2 is a block diagram illustrating an example network element operable to facilitate the generation of, and user interaction with, a spatial representation of network elements.

FIG. 2 is a block diagram illustrating an example network element 200 operable to facilitate the generation of, and user interaction with, a spatial representation of network elements. The network element 200 may be a client device 110 of FIG. 1, CPE device (e.g., STB 115 of FIG. 1, etc.), access point 120 of FIG. 1, IoT device 125 of FIG. 1, and/or any other device operable to receive communication, video, voice, and/or data services. The network element 200 may include a display interface 205, a client interface 210, a spatial layout module 215, and an element manager module 220.

In embodiments, the spatial layout module 215 may retrieve and maintain spatial relationships between network elements of the subscriber premise 105. User input of identifier selections and placement of identifiers within a grid may be received through the client interface 210 (e.g., through an RCU, touchscreen, etc.). The spatial layout module 215 may save identifier and positioning information for each of one or more network elements, and the spatial layout module 215 may output a two-dimensional or three-dimensional spatial representation of the network elements to a display screen through the display interface 205.

In embodiments, the element manager module 220 may retrieve status information (e.g., power state, tuning state, content displayed, wireless capability/availability, etc.) associated with the network elements included within the spatial representation. For example, the element manager module 220 may periodically request state information from each of the network elements included within the spatial representation, or the element manager module 220 may receive status updates from a network element when the network element experiences a power state change (e.g., powers up or down) or when the network element otherwise reports a status update or notification.

In embodiments, the element manager module 220 may retrieve or may take measurements of performance at one or more network elements. For example, the element manager module 220 may retrieve or may measure wireless bandwidth at one or more network elements.

Figure 3:
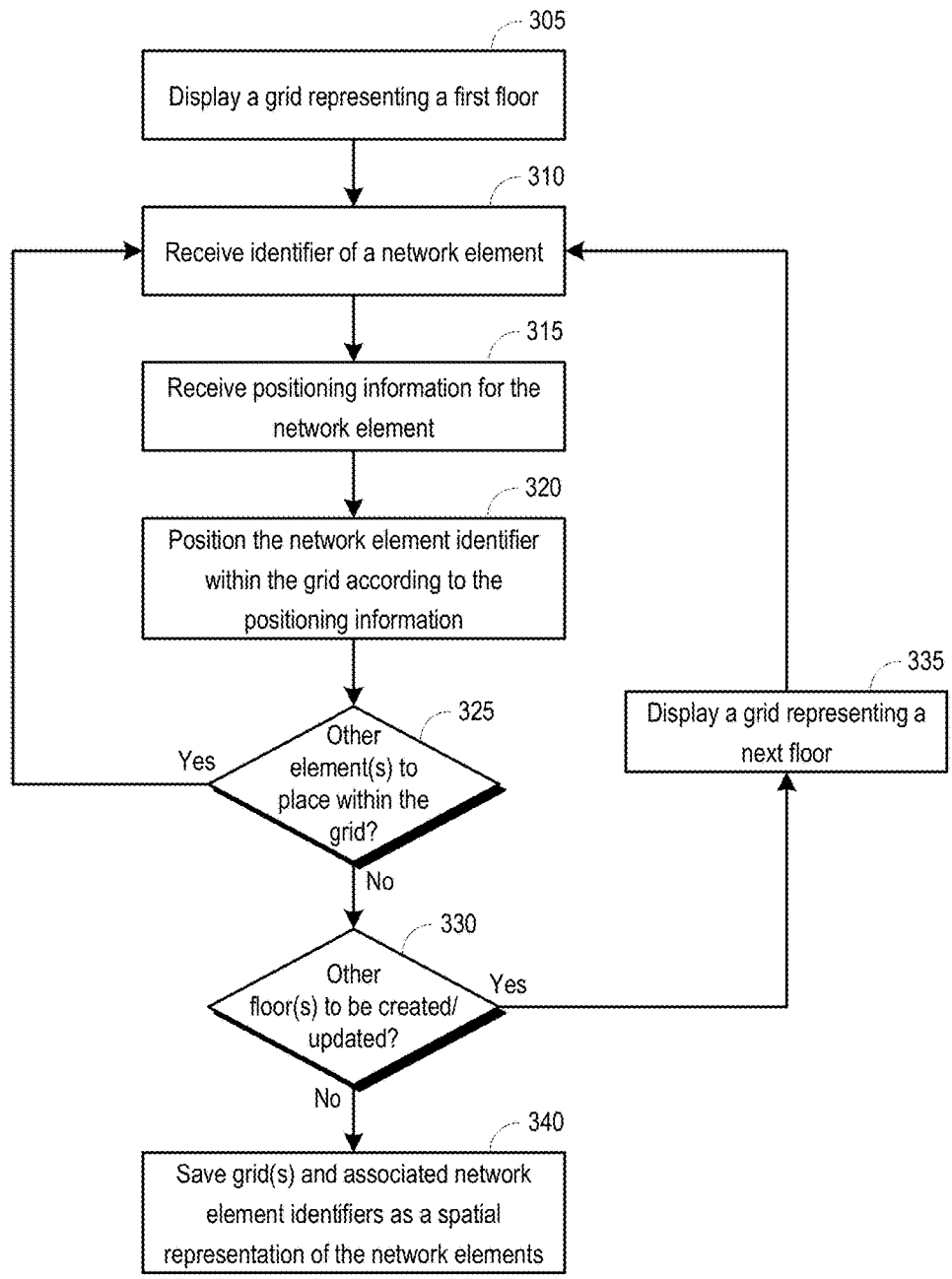
FIG. 3 is a flowchart illustrating an example process operable to generate a spatial representation of network elements.

FIG. 3 is a flowchart illustrating an example process 300 operable to generate a spatial representation of network elements. The process 300 can begin at 305, when a grid representing a first floor is displayed. The grid may be displayed, for example, by a managing network element (e.g., network element 200 of FIG. 2 such as a STB, mobile device, tablet, computer, or other network element through which generation of a spatial representation of network elements is requested), and the grid may be displayed at a screen associated with the managing network element (e.g., television, monitor, display screen, etc.). In embodiments, the grid may be displayed as a user interface that includes user-selectable options for modifying the grid.

At 310, an identifier of a network element may be received. The identifier of the network element may be received, for example, by the managing network element. In embodiments, the identifier of the network element may be received as user input such as a user selection of a network element identifier. For example, a user may select an icon or other symbol to represent the network element within the grid.

At 315, positioning information for the network element may be received. The positioning information may be received, for example, by the managing network element. In embodiments, the positioning information may be received as a user placement of the network element identifier within a displayed grid. For example, a user may place the network element identifier at a position within the grid that is representative of the physical location of the associated network element within a subscriber premise. A user may place the network element identifier at a position within the grid respective of borders of the grid and/or other network element identifiers displayed within the grid. It will be appreciated by those skilled in the relevant art that various techniques may be used to position the network element identifier at a desired location with the grid (e.g., drag-and-drop method via a touchscreen or RCU).

At 320, the network element identifier may be positioned within the grid according to the positioning information. The network element identifier may be positioned within the grid, for example, by the managing network element (e.g., spatial layout module 215 of FIG. 2). In embodiments, the managing network element may save the position of the network element identifier within the grid.

At 325, a determination may be made whether other network element(s) are to be placed within the grid. The determination whether one or more other network elements are to be placed within the grid may be made, for example, by the managing network element. In embodiments, the managing network element may prompt a user to input a decision whether to place other network element(s) within the grid, and the managing network element may make the determination whether one or more other network elements are to be placed within the grid based upon the user input.

If, at 325, the determination is made that other network element(s) are to be placed within the grid, the process 300 may return to 310, where an identifier of another network element may be received.

If, at 325, the determination is made that one or more other network elements are not to be placed within the grid, the process 300 may proceed to 330. At 330, a determination may be made whether one or more grids representing one or more other floors are to be created or updated. The determination whether one or more grids representing one or more other floors are to be created or updated may be made, for example, by the managing network element. In embodiments, the managing network element may prompt a user to input a decision whether to create or edit a grid representing another floor, and based upon the user input, the managing network element may make the determination whether one or more grids representing one or more other floors are to be created.

If, at 330, the determination is made that one or more grids representing one or more other floors are to be created or updated, the process 300 may proceed to 335. At 335, a grid representing a next floor may be displayed. The grid may be displayed, for example, by the managing network element, and the grid may be displayed at a screen associated with the managing network element (e.g., television, monitor, display screen, etc.). In embodiments, the grid may be displayed as a user interface that includes user-selectable options for modifying the grid. After displaying the grid representing the next floor, an identifier of a network element to be positioned within the grid may be received at 310.

If, at 330, the determination is made that no other grid representing another floor is to be created or updated, the process 300 may proceed to 340. At 340, the grid(s) and associated network element identifiers may be saved as a spatial representation of the network elements. The grid(s) and associated network element identifiers may be saved as a spatial representation of the network elements, for example, by the managing network element. The spatial representation of the network elements may be stored at the managing network element, another network element associated with the subscriber premise, an upstream server, or another storage device.

Figure 4:
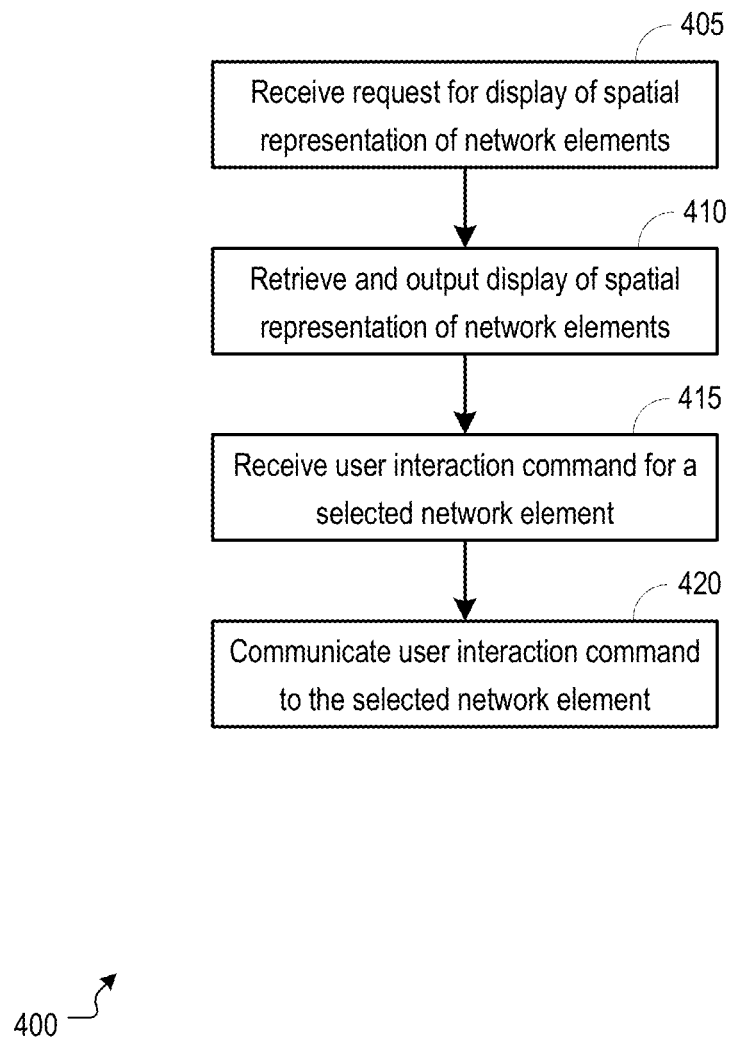
FIG. 4 is a flowchart illustrating an example process operable to facilitate a user-interaction with a spatial representation of network elements.

FIG. 4 is a flowchart illustrating an example process 400 operable to facilitate a user-interaction with a spatial representation of network elements. The process 400 can begin at 405, when a request for displaying a spatial representation of network elements is received. The request may be received, for example, by a managing network element (e.g., network element 200 of FIG. 2 such as a STB, mobile device, tablet, computer, or other network element through which generation of a spatial representation of network elements is requested).

At 410, the spatial representation of network elements may be retrieved and output to a display. The spatial representation of network elements may be retrieved and output, for example, by the managing network element, and the spatial representation of network elements may be displayed at a screen associated with the managing network element (e.g., television, monitor, display screen, etc.). In embodiments, the spatial representation of network elements may be displayed as a user interface that includes user-selectable options for viewing and interfacing with network elements represented by network element identifiers within one or more grids.

At 415, a user interaction command for a selected network element may be received. The user interaction command for a selected network element may be received, for example, by the managing network element. In embodiments, the user interaction command may be received at the managing network element as user input through an interface to the managing network element (e.g., RCU, touchscreen, etc.). It should be understood that the user interaction command may include various types of commands for interfacing with various types of network elements.

At 420, the user interaction command may be communicated to the selected network element. The user interaction command may be communicated directly to the selected network element from the managing network element, or the user interaction command may be routed to the selected network element through another network element (e.g., gateway, access point, etc.). It should be understood that various communication protocols may be used to pass the interaction command to the selected network element.

Figure 5:
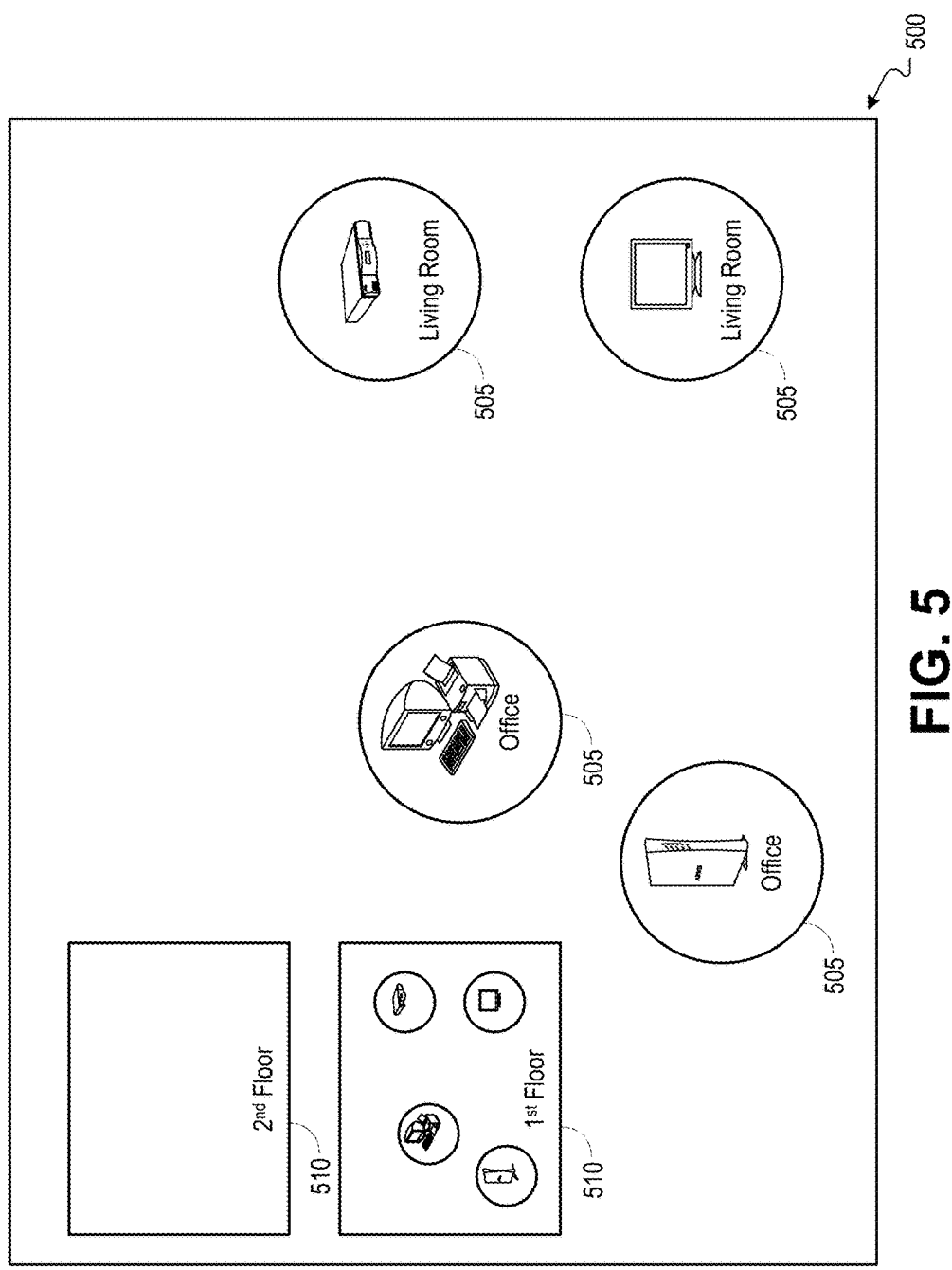
FIG. 5 is an illustration of an example user interface operable to facilitate the display and placement of network elements within a grid representing a region of a subscriber premise.

FIG. 5 is an illustration of an example user interface 500 operable to facilitate the display and placement of network elements within a grid representing a region of a subscriber premise. The user interface 500 may be generated by a managing network element (e.g., network element 200 of FIG. 2 such as a STB, mobile device, tablet, computer, or other network element through which generation of a spatial representation of network elements is requested). In embodiments, the user interface 500 may be displayed at a screen associated with the managing network element (e.g., television, monitor, display screen, etc.). It will be appreciated by those skilled in the relevant art that the user interface 500 may be displayed to a subscriber using various interface types (e.g., graphical user interface (GUI), touch-screen interface, etc.).

The user interface 500 may be used to create, edit, and view spatial relationships between network elements associated with a subscriber premise. The network elements may be represented by network element identifiers 505 (e.g., icons, text boxes, etc.), and the network element identifiers 505 may be placed, by a user, within a grid that is displayed within the user interface 500. For example, a user may add a network element identifier 505 to the grid by selecting (e.g., clicking with an input device such as a remote control unit (RCU) or mouse, or finger for a touchscreen application) an open space in the grid and placing the network element identifier 505 within the open space. The open space may be determined by a user based on an estimated distance of the network element represented by the network element identifier 505 from another network element represented by a network element identifier 505 that is shown within the grid. It should be understood that the location of the network element identifier 505 within the grid may be selected automatically based on a current location of a user within a subscriber premise when the user selects an option to add the network element identifier 505 to the grid. For example, the user may stand at the location of the corresponding network element and may initiate the adding of the network element identifier 505 using the corresponding network element or another network element (e.g., managing network element such as a mobile device, tablet, computer, etc.) upon which the spatial relationship application is running. It should be further understood that the position of the network element identifier 505 within the grid may be automatically determined based upon a spatial determination made by a device of the home network. For example, a determination of the proximity and direction of a network element from an access point (e.g., gateway, network extender, etc.) may be made by the access point based upon the strength of a signal between the network element and the access point, and the determined proximity and direction may be used to place the associated network element identifier 505 within the grid. Direction of the network element may be determined, for example, using a plurality of receivers (e.g., multiple-input and multiple-output (MIMO).

In embodiments, the user interface 500 may include a window displaying one or more options for representing a specific network element within a grid. For example, the window may be displayed over the top of the grid layout. The window may include a plurality of icons representing various types of devices. The identifiers may be filtered or organized within the window based on various parameters (e.g., rooms, managed equipment, subscriber devices, etc.).

In embodiments, the network element identifier 505 may be an image or icon that describes or suggests the device identity, functionality, and/or status. For example, each network element identifier 505 may be an icon associated with the type of device (e.g., gateway, set-top box (STB), gaming device, mobile device, etc.) that is represented by the network element identifier 505. In embodiments, each network element identifier 505 may be associated with a textual identifier, wherein the textual identifier describes a device type associated with the network element represented by the network element identifier 505, a name of the network element (e.g., a name assigned to the network element by a user/owner), a user associated with the network element, or other characteristic(s).

In embodiments, a network element identifier 505 may include various identification information (e.g., room, device type, name of device, etc.) and/or wireless performance information (e.g., signal strength between device and access point, distance from access point, etc.). The signal strength may be indicated based on the color of a network element identifier's 505 background and/or a value representing the signal strength displayed within the network element identifier 505.

In embodiments, the user interface 500 may provide a user with the option to add additional grids to a spatial representation for each floor or region of a subscriber premise, and each individual grid representing a floor or region may be displayed in a two-dimensional layout. The floors or regions of a subscriber premise may be shown within the user interface 500, and a user may cause the grid associated with a specific floor or region to be displayed by selecting a region identifier 510 (e.g., thumbnail or embedded display of network element identifiers associated with a floor or region of the subscriber premise).

In embodiments, each network element identifier 505 may include information associated with a relationship between the corresponding network element and an access point. For example, the network element identifier 505 may include information identifying a distance between the corresponding network element and an access point and information identifying the strength of a signal between the corresponding network element and an access point. Moreover, a color spectrum may be used to indicate the strength of a wireless signal between the corresponding network element and an access point. For example, the background of the network element identifier 505 may be colored according to the strength of a signal between the corresponding network element and an access point (e.g., green for strong signal, red for weak signal, etc.).

In embodiments, each network element identifier 505 may include a background associated with the status of the network element represented by the network element identifier 505. For example, the background may be colored according to whether the corresponding network element is active/inactive, connected/disconnected, on/off, or according to other status or configuration information. As another example, the network element identifier 505 may include a symbol designated to indicate when the network element represented by the network element identifier 505 is capable of receiving and/or transmitting wireless communications (e.g., Wi-Fi symbols) and whether or not the network element is successfully paired with another device via a wireless connection (e.g., Wi-Fi connection, Bluetooth connection, etc.).

In embodiments, a unique identification symbol may be used to identify a network element that is managed by a service provider. For example, a star symbol may be added to a network element identifier 505 representing a network element (e.g., STB, gateway device, etc.) that is managed by a service provider.

In embodiments, the user interface 500 may include a display of a current and/or past wireless strength of one or more bands (e.g., 2.4 GHz, 5 GHz) provided by one or more access points.

In embodiments, network element identifiers 505 may be moved around the grid by touching or clicking a network element identifier 505 and dragging the network element identifier 505 to a different location within the grid. A user may move a network element identifier 505 to a different grid representing a different floor or region of the subscriber premise by dragging the network element identifier 505 to an icon associated with the new floor or region (e.g., region identifier 510). A user may remove a network element identifier 505 from a grid by dragging the network element identifier 505 to an icon representing removal of the identifier (e.g., trash bin or other symbol).

In embodiments, the user interface 500 may include an option for switching between a two-dimensional view of grids representing individual floor or regions of a subscriber premise and a three-dimensional view of grids representing one or more of the floors or regions of the subscriber premise. The transition between the two-dimensional and three-dimensional views may be animated to allow a user to better follow and identify the network elements. The items in the three-dimensional view can be shown in a vertical perspective to make it easier to view and read text.

Figure 6:
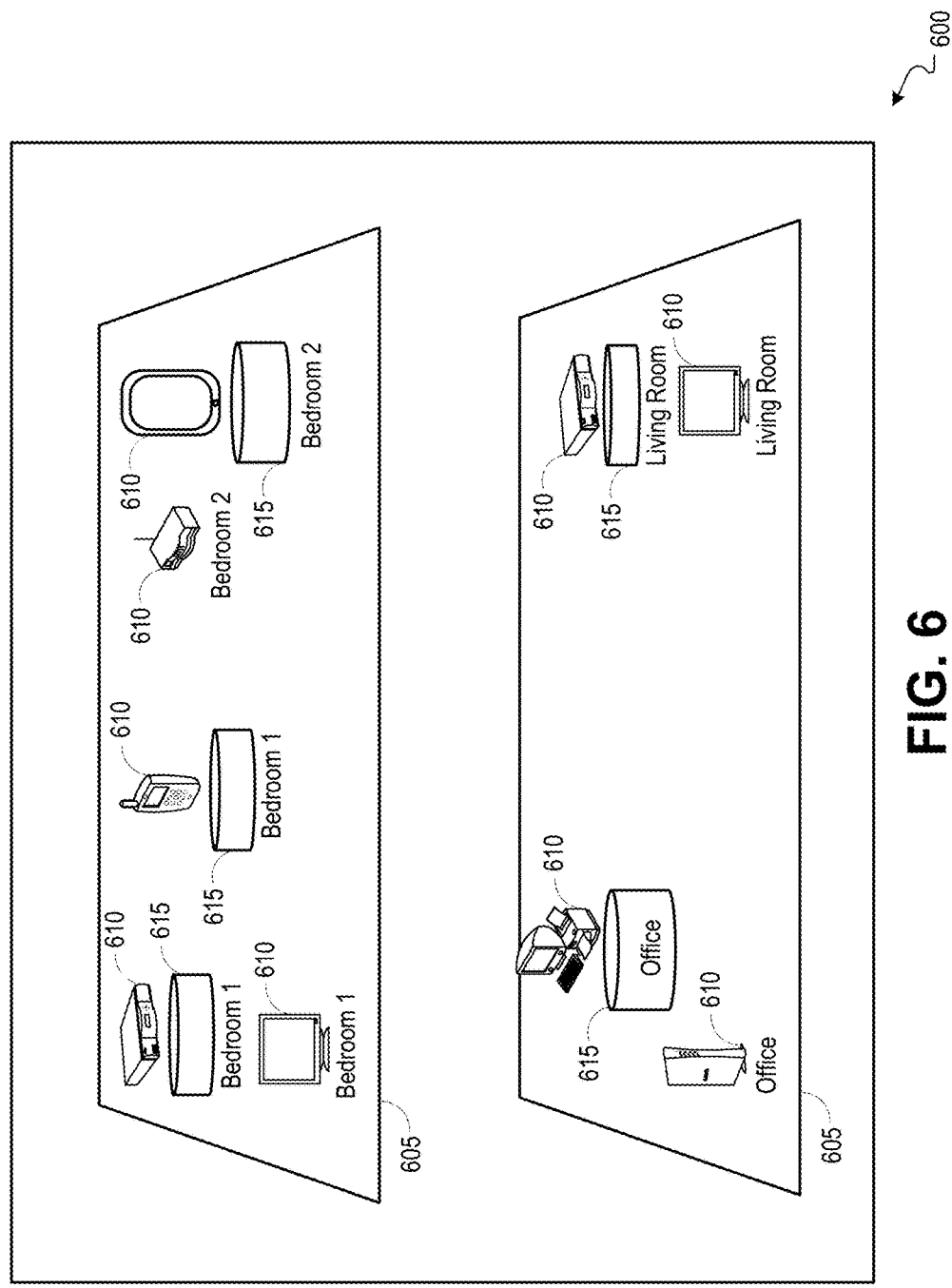
FIG. 6 is an illustration of an example user interface operable to facilitate the display of, and user-interaction with, a three-dimensional spatial representation of network elements.

FIG. 6 is an illustration of an example user interface 600 operable to facilitate the display of, and user-interaction with, a three-dimensional spatial representation of network elements. The three-dimensional spatial representation of network elements may include a display of one or more three-dimensional grids 605, each three-dimensional grid 605 representing a floor or region of a subscriber premise. Three-dimensional network element identifiers 610 may be positioned within the three-dimensional grids 605, wherein each three-dimensional network element identifier 610 represents a network element within the subscriber premise, and wherein each three-dimensional network element 610 is positioned within the three-dimensional grid 605 that represents a floor or region of the subscriber premise within which the network element is physically located. In embodiments, a three-dimensional network element identifier 610 may include an identification of the strength of a signal existing between the associated network element and an access point. For example, a color spectrum and/or the height of a bar 615 (e.g., relative height of cylindrical bar) may be used to depict a signal strength.

Figure 7:
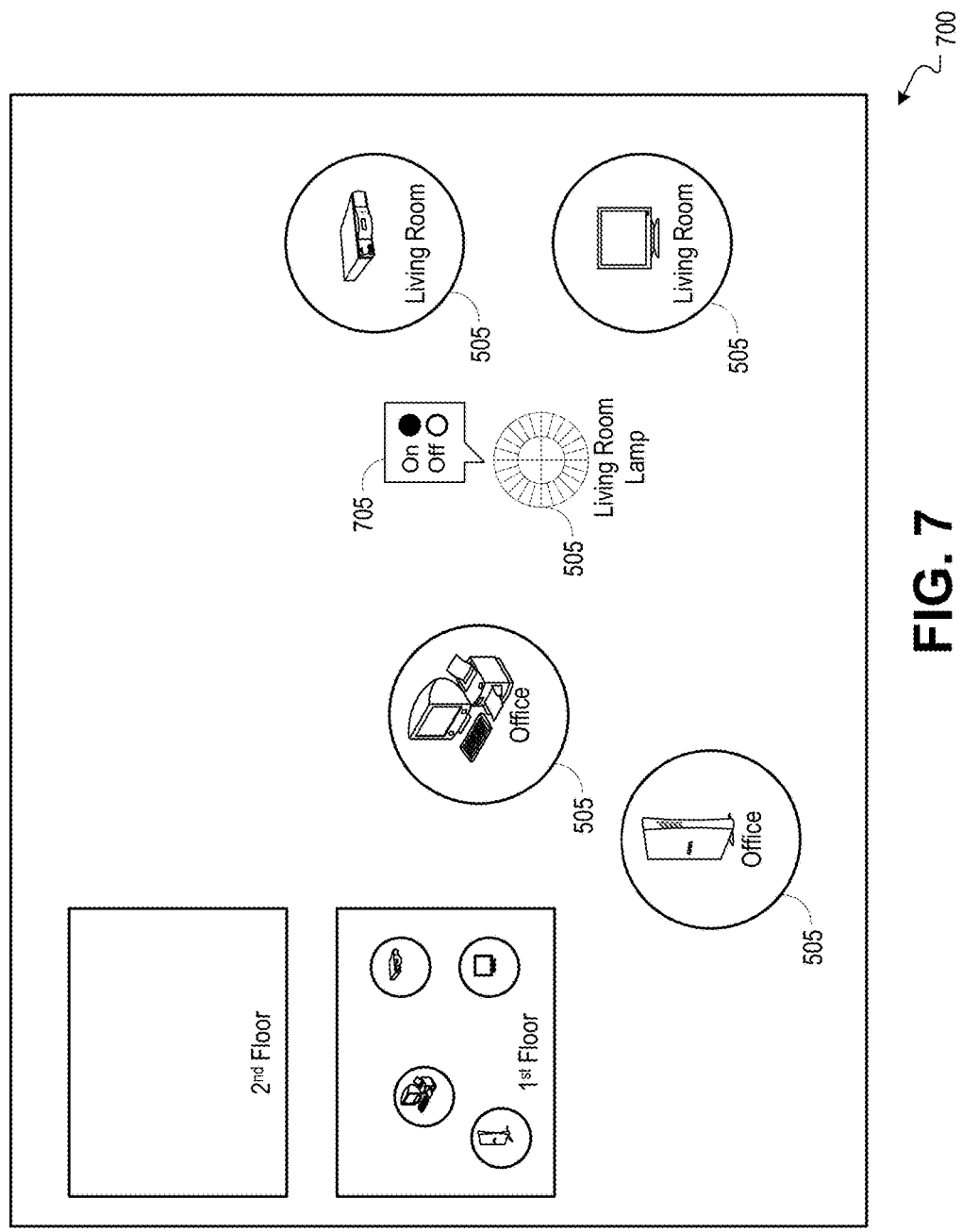
FIG. 7 is an illustration of an example user interface operable to facilitate the user-interaction with network elements displayed within a grid representing a region of a subscriber premise.

FIG. 7 is an illustration of an example user interface 700 operable to facilitate the user-interaction with network elements displayed within a grid representing a region of a subscriber premise. In embodiments, the user interface 700 may be used to control or manage one or more network elements (e.g., network elements 200 of FIG. 2) within a subscriber premise. The user interface 700 may include a spatial layout of network elements, including IoT devices, and the network elements may be represented within the layout as network element identifiers 505. Each network element identifier 505 may include an icon representative of the type of device associated with the network element identifier 505, text identifying the type of device, or name of the device, and or other information associated with the device. For example, a network element identifier 505 representing a temperature control device may include an identification of the current temperature of an area of the premise or a current setting of the temperature control device.

In embodiments, a network element identifier 505 may include an interaction window 705 through which a user may select an option for interacting with the associated network element. When a network element identifier 505 is selected (e.g., user selects or scrolls over the network element identifier 505 using a control device such as a RCU or touchscreen), one or more control options associated with the network element represented by the network element identifier 505 may be presented within the interaction window 705. In embodiments, a currently selected network element identifier 505, or a network element identifier 505 at which a control interface is currently pointing, may be identified within the user interface 700 based on a distinguishing coloring or highlighting of the network element identifier 505. For example, when the network element identifier 505 is selected (e.g., the living room lamp icon), the user interface 700 may display a toggle (e.g., within the interaction window 705) allowing the user to turn the network element on/off and a slide allowing the user to dim the light of the lamp. It should be understood that various other actions may be offered to a user based on the type of network element represented by a selected network element identifier 505. For example, a interaction window 705 may provide a user with an interface for adjusting the temperature of a temperature control unit, locking a door, opening/closing a door (e.g., garage door), adjusting the volume of a sound system, viewing video captured by a camera, and many others. Selection of a network element identifier 505 may result in a display of certain information associated with the device. For example, when a user selects a network element identifier 505 representing a door, the interaction window 705 may display the time at which the door was last opened and/or closed.

It should be understood that a user may navigate through the various network element identifiers 505 depicted within the user interface 700 and select a network element identifier 505 using various input devices (e.g., finger for a touchpad/touchscreen, mouse/trackpad, D-Pad associated with RCU, etc.). Moreover, device controls may be operated using any of the various input devices. For example, a D-Pad may control a toggle displayed within an interaction window 705 (e.g., the lamp switch toggle shown) via an "Enter/Select" button, and left/right or up/down arrows may control a sliding bar displayed within an interaction window 705 (e.g., the dimming of the lamp). A user may exit an interaction window 705 associated with a selected network element identifier 505 using a "Back/Return" button.

In embodiments, the display of a network element identifier 505 may be modified according to a user-interaction with, or current status of a network element represented by the network element identifier 505. For example, a color scheme or highlighting of the network element identifier 505 may be modified to indicate the current status of the network element represented by the network element identifier 505 (e.g., the identifier representing the lamp may be highlighted to give the identifier the appearance of being lighted based on the lamp being turned on by the user). As another example, a door icon may be shown in the open position when the door is opened and vice versa.

It should be understood that a user may navigate through network element identifiers 505 located within different grids representing different floors or regions of a subscriber premise. For example, a user may navigate through three-dimensional network elements 610 of FIG. 6 shown within the user interface 600 of FIG. 6 to control the associated network elements.

Figure 8:
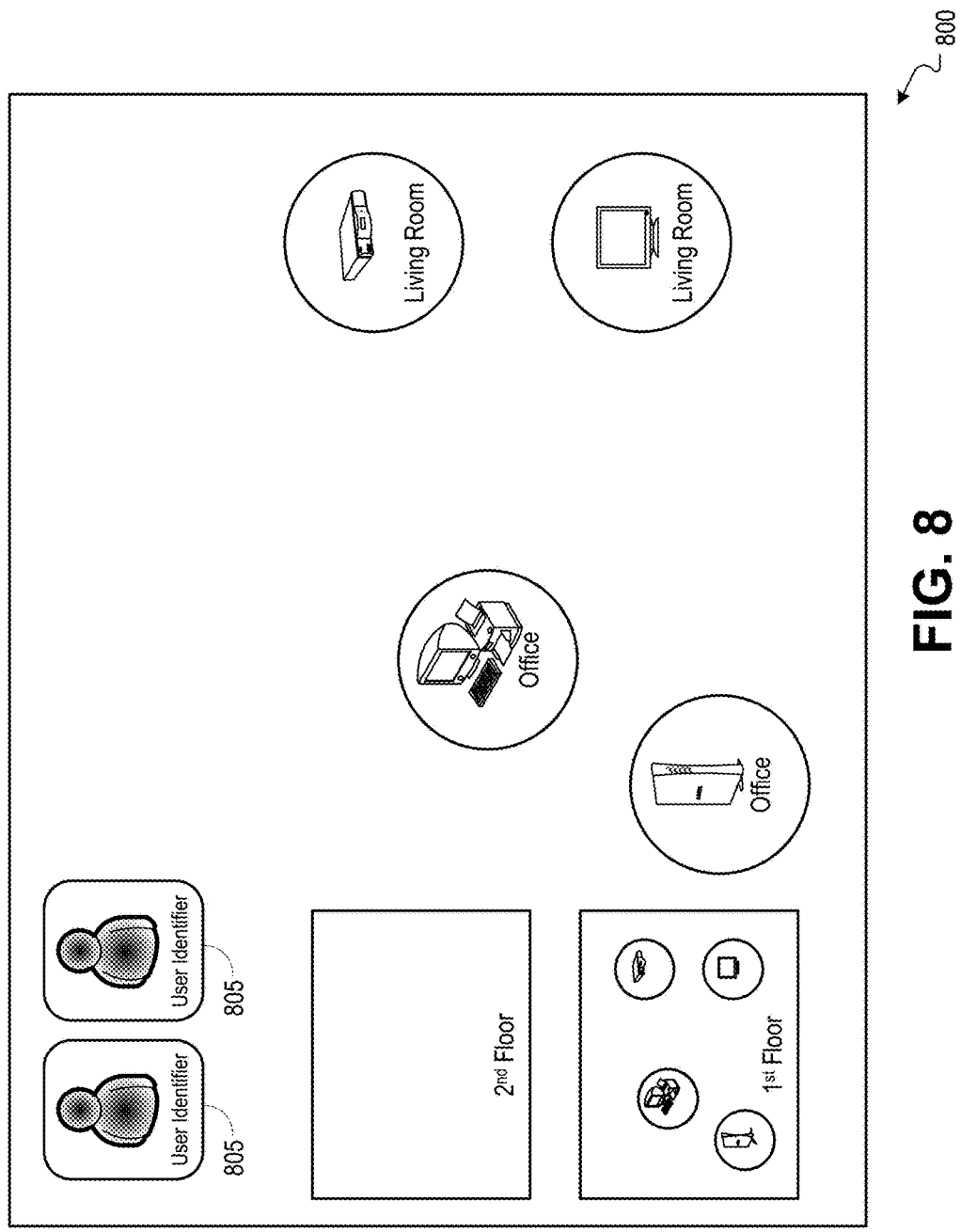
FIG. 8 is an illustration of an example user interface operable to display an identification of one or more users located within a subscriber premise.

FIG. 8 is an illustration of an example user interface 800 operable to display an identification of one or more users located within a subscriber premise. In embodiments, the user interface 800 may include one or more user identifiers 805, wherein each of the displayed user identifiers 805 includes an icon, photograph, or other identifier associated with a user that is determined to be within the associated subscriber premise. An identification of users within a subscriber premise may be based on the identified presence, within the subscriber premise, of a personal device that is associated with a user (e.g., mobile device, wearable, etc.). The presence of a personal device within the subscriber premise may be determined based upon a wireless communication being received by an access point or other device within the subscriber premise.

In embodiments, one or more user identifiers 805 may be displayed within the user interface 800, wherein each of the one or more user identifiers 805 is associated with a user that is currently, or that has been associated with the subscriber premise (e.g., residents of the subscriber premise), and one or more of the user identifiers 805 associated with users that are determined to be within the subscriber premise may be highlighted, or otherwise distinguished, to indicate the presence of the corresponding user within the subscriber premise.

Figure 9:
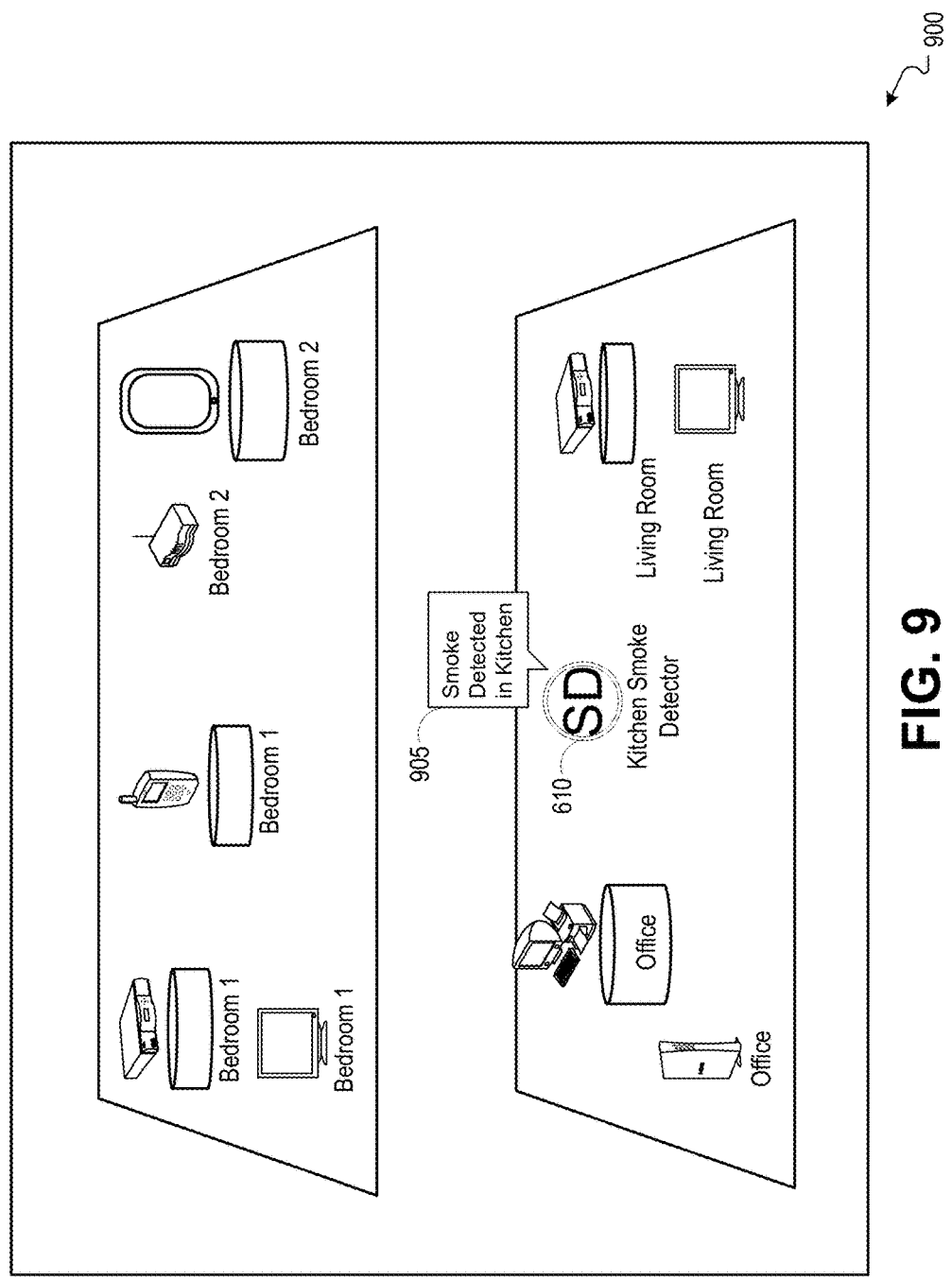
FIG. 9 is an illustration of an example user interface operable to display a message received from a network element.

FIG. 9 is an illustration of an example user interface 900 operable to display a message received from a network element. In embodiments, a message window 905 may be displayed within the user interface 900 when a message is received from a network element within a subscriber premise. The user interface 900 may be updated when a message is received (e.g., at a managing network element 200 of FIG. 2) from a network element, wherein the message and/or other information associated with the message is displayed within a message window 905. The message window 905 may be displayed within the user interface 900 in such a way as to indicate to a user, the network element from which the corresponding message was received. For example, the message window 905 may be displayed along with a displayed connection to the identifier (e.g., network element identifier 505 of FIG. 5, three-dimensional network element 610, etc.) representing the network element from which the corresponding message was received.

In embodiments, the message window 905 may display an alert message when an alert condition occurs or is otherwise identified by a network element. For example, when a smoke alarm (e.g., kitchen smoke detector) within the subscriber premise is triggered, the message window 905 may display an alert message identifying the specifics of the alert (e.g., "Smoke Detected in Kitchen"), the network element identifying the alert condition, and one or more options for dealing with the alert (e.g., the message window 905 may provide a user with the option to silence the alarm and close the displayed alert message). It should be understood that other alert messages may be possible based on the type of device initiating the alert. For example, reminders may be displayed within a message window 905 based on a need to remove clothes from a dryer, to remove a dish from an oven, and others.

It should be understood that a message window 905 may be displayed within a two-dimensional or three-dimensional spatial representation of network elements.

Figure 10:
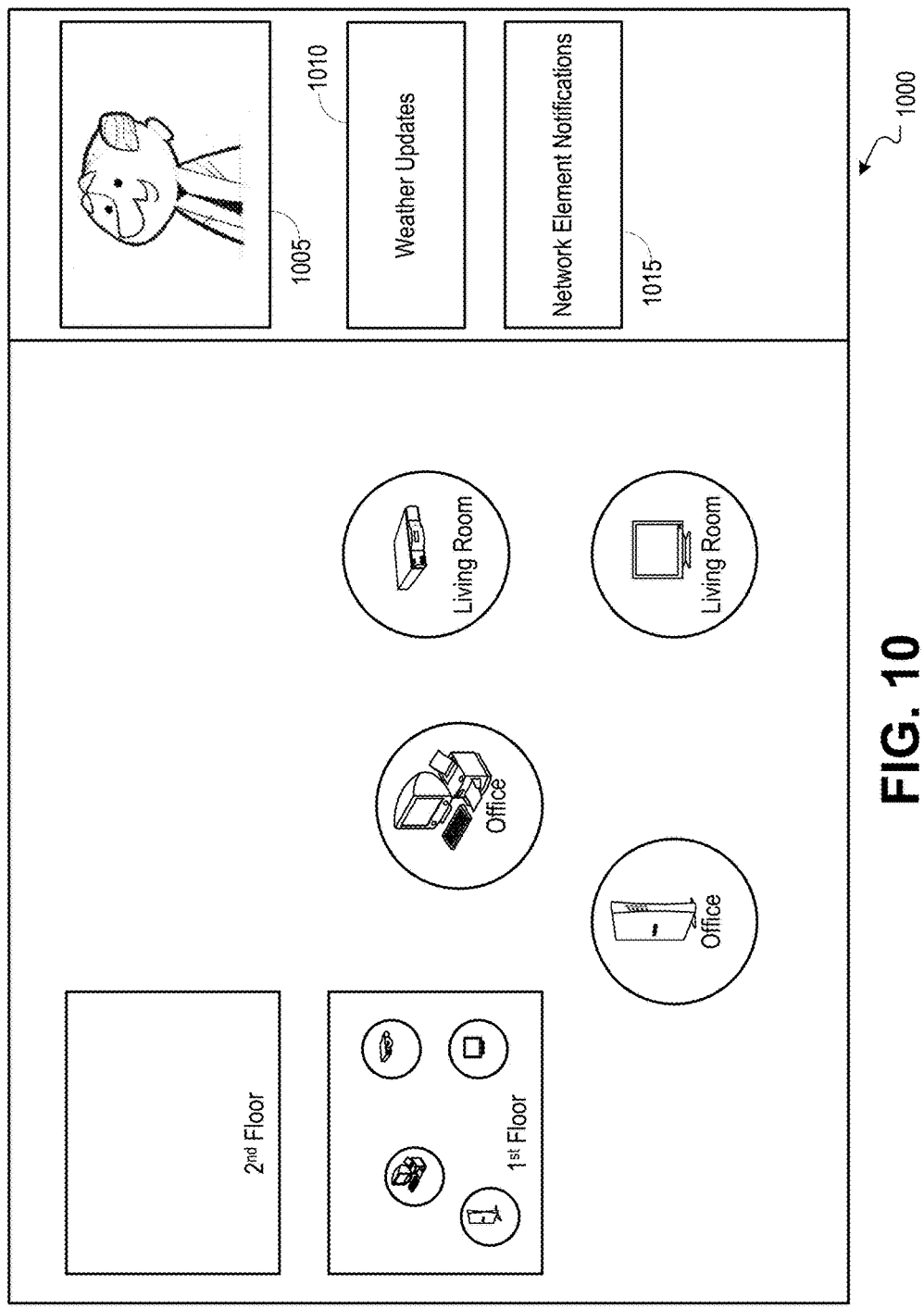
FIG. 10 is an illustration of an example user interface operable to display one or more content and/or notification windows along with a spatial representation of network elements.

FIG. 10 is an illustration of an example user interface 1000 operable to display one or more content and/or notification windows along with a spatial representation of network elements. In embodiments, the user interface 1000 may include a display of two-dimensional or three-dimensional spatial representation of network elements within a subscriber premise along with one or more content and/or notification windows. The user interface 1000 may include a video feed window 1005, wherein the video feed window 1005 may include a display of multimedia content being viewed by a user, video feed footage from a security camera, or other content. The user interface 1000 may include one or more other notification windows such as a weather updates window 1010 or network element notifications window 1015 (e.g., a window displaying status information or messages associated with network elements within the corresponding subscriber premise).

Figure 11:
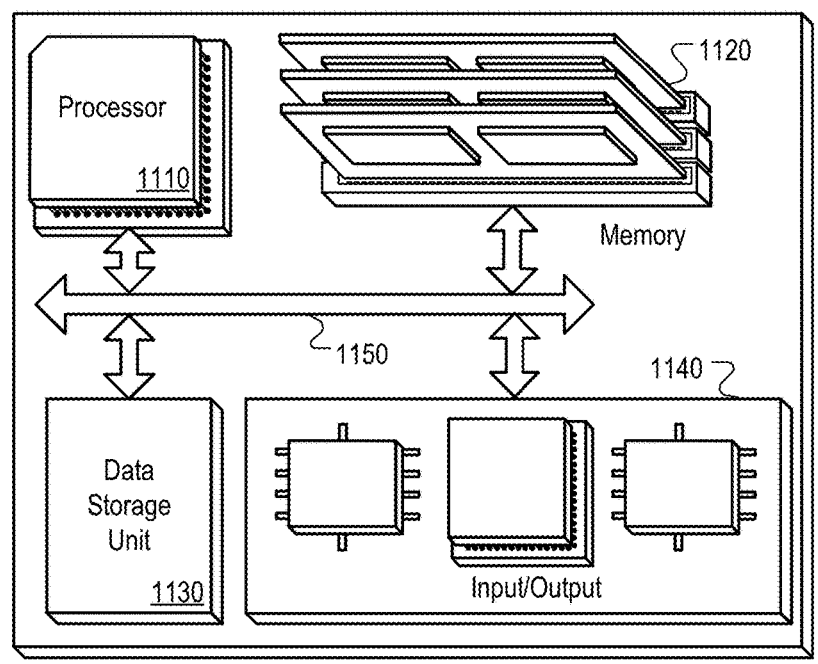
FIG. 11 is a block diagram of a hardware configuration operable to facilitate the generation of, and user interaction with, a spatial representation of network elements.

FIG. 11 is a block diagram of a hardware configuration 1100 operable to facilitate the generation of, and user interaction with, a spatial representation of network elements. The hardware configuration 1100 can include a processor 1110, a memory 1120, a storage device 1130, and an input/output device 1140. Each of the components 1110, 1120, 1130, and 1140 can, for example, be interconnected using a system bus 1150. The processor 1110 can be capable of processing instructions for execution within the hardware configuration 1100. In one implementation, the processor 1110 can be a single-threaded processor. In another implementation, the processor 1110 can be a multi-threaded processor. The processor 1110 can be capable of processing instructions stored in the memory 1120 or on the storage device 1130.

The memory 1120 can store information within the hardware configuration 1100. In one implementation, the memory 1120 can be a computer-readable medium. In one implementation, the memory 1120 can be a volatile memory unit. In another implementation, the memory 1120 can be a non-volatile memory unit.

In some implementations, the storage device 1130 can be capable of providing mass storage for the hardware configuration 1100. In one implementation, the storage device 1130 can be a computer-readable medium. In various different implementations, the storage device 1130 can, for example, include a hard disk device, an optical disk device, flash memory or some other large capacity storage device. In other implementations, the storage device 1130 can be a device external to the hardware configuration 1100.

The input/output device 1140 provides input/output operations for the hardware configuration 1100. In embodiments, the input/output device 1140 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a network element (e.g., client device 110 of FIG. 1, STB 115 of FIG. 1, access point 120 of FIG. 1, IoT device 125 of FIG. 1, etc.). In embodiments, the input/output device can include driver devices configured to send communications to, and receive communications from one or more networks (e.g., local network 110 of FIG. 1, subscriber network 125 of FIG. 1, WAN 120 of FIG. 1, etc.).

Those skilled in the art will appreciate that the invention improves upon methods and systems for creating and interfacing with a layout of network elements within a subscriber premise. Described herein is a method, system, and computer readable media that allows for the flexible relative placement of network elements within a spatial representation of network elements within a subscriber premise without requiring exact measurements, a complete floor plan, or exact tracking by a technician. Thus, the methods, systems, and computer readable media described herein provide for a quick generation of a layout without the need to draw detailed floor plans of a premise. An interface showing the layout of network elements within a subscriber premise may include an identification of the quality of wireless performance (e.g., signal strength) at each network element. A user may interface with, and monitor the network elements through the user interface displaying the spatial representation of the various network elements.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   displaying one or more grids, wherein each grid is associated with a region of a subscriber premise, and wherein the grid does not include a display of a floor plan associated with the region of the subscriber premise;
   receiving one or more network element identifiers, wherein each of the one or more network element identifiers is associated with a network element located within the subscriber premise;
   for each respective one network element identifier of the one or more network element identifiers:
   receiving an identification of a position within an identified grid, wherein the identification of the position within the identified grid comprises a position respective of one or more borders of the identified grid or one or more other network element identifiers displayed within the identified grid, wherein the identified position of the respective one network element identifier corresponds with a position of the associated network element respective of one or more borders of the subscriber premise or one or more network elements associated with the one or more other network element identifiers; and
   associating the respective one network element identifier with the identified position within the identified grid;
   generating a spatial representation of network elements within the subscriber premise based upon the identified position and identified grid for each of the one or more network element identifiers.

2. The method of claim 1, wherein the identification of the position within the identified grid is received as a placement, by a user, of the respective one network element identifier within the identified grid.

3. The method of claim 1, further comprising:
   retrieving status information for one or more of the network elements associated with the one or more network element identifiers; and
   updating the network element identifiers associated with the one or more network elements according to the retrieved status information.

4. The method of claim 1, further comprising:
   outputting the spatial representation of network elements within the subscriber premise to a display screen.

5. The method of claim 4, further comprising:
   receiving, through the spatial representation, a user interaction command for a target network element identifier; and
   outputting the user interaction command to the network element associated with the target network element identifier.

6. The method of claim 4, further comprising:
   receiving a message from a network element; and
   updating the network element identifier associated with the network element to display the message within the spatial representation.

7. The method of claim 4, further comprising:
   determining that one or more users are present within the subscriber premise based upon an identification of a wireless communication received from a client device associated with the one or more users; and
   updating the spatial representation to include a user identifier associated with each of the one or more users that are determined to be present within the subscriber premise.

8. The method of claim 4, further comprising:
   outputting a content window along with the spatial representation, wherein the content window comprises a display of a video feed.

9. An apparatus comprising:
   a display interface configured to be used to display one or more grids, wherein each grid is associated with a region of a subscriber premise, and wherein the grid does not include a display of a floor plan associated with the region of the subscriber premise;
   an input interface configured to be used to receive:
   one or more network element identifiers, wherein each of the one or more network element identifiers is associated with a network element located within the subscriber premise; and
   for each respective one network element identifier of the one or more network element identifiers, an identification of a position within an identified grid, wherein the identification of the position within the identified grid comprises a position respective of one or more borders of the identified grid or one or more other network element identifiers displayed within the identified grid, wherein the identified position of the respective one network element identifier corresponds with a position of the associated network element respective of one or more borders of the subscriber premise or one or more network elements associated with the one or more other network element identifiers; and
   a spatial layout module configured to:
   associate each respective one network element identifier with the identified position within the identified grid; and
   generate a spatial representation of network elements within the subscriber premise based upon the identified position and identified grid for each of the one or more network element identifiers.

10. The apparatus of claim 9, further comprising:
    an element manager module configured to retrieve status information for one or more of the network elements associated with the one or more network element identifiers; and
    wherein the spatial layout module is further configured to update the network element identifiers associated with the one or more network elements according to the retrieved status information.

11. The apparatus of claim 9, wherein:
the display interface is further configured to be used to output the spatial representation of network elements within the subscriber premise to a display screen;
the input interface is further configured to be used to receive, through the spatial representation, a user interaction command for a target network element identifier; and
the spatial layout module is further configured to output the user interaction command to the network element associated with the target network element identifier.

12. The apparatus of claim 9, wherein:
the display interface is further configured to be used to output the spatial representation of network elements within the subscriber premise to a display screen; and
the spatial layout module is further configured to:
receive a message from a network element; and
update the network element identifier associated with the network element to display the message within the spatial representation.

13. One or more non-transitory computer readable media having instructions operable to cause one or more processors to perform the operations comprising:
displaying one or more grids, wherein each grid is associated with a region of a subscriber premise, and wherein the grid does not include a display of a floor plan associated with the region of the subscriber premise;
receiving one or more network element identifiers, wherein each of the one or more network element identifiers is associated with a network element located within the subscriber premise;
for each respective one network element identifier of the one or more network element identifiers:
receiving an identification of a position within an identified grid, wherein the identification of the position within the identified grid comprises a position respective of one or more borders of the identified grid or one or more other network element identifiers displayed within the identified grid, wherein the identified position of the respective one network element identifier corresponds with a position of the associated network element respective of one or more borders of the subscriber premise or one or more network elements associated with the one or more other network element identifiers; and
associating the respective one network element identifier with the identified position within the identified grid;
generating a spatial representation of network elements within the subscriber premise based upon the identified position and identified grid for each of the one or more network element identifiers.

14. The one or more non-transitory computer-readable media of claim 13, wherein the identification of the position within the identified grid is received as a placement, by a user, of the respective one network element identifier within the identified grid.

15. The one or more non-transitory computer-readable media of claim 13, wherein the instructions are further operable to cause the one or more processors to perform the operations comprising:
retrieving status information for one or more of the network elements associated with the one or more network element identifiers; and
updating the network element identifiers associated with the one or more network elements according to the retrieved status information.

16. The one or more non-transitory computer-readable media of claim 13, wherein the instructions are further operable to cause the one or more processors to perform the operations comprising:
outputting the spatial representation of network elements within the subscriber premise to a display screen.

17. The one or more non-transitory computer-readable media of claim 16, wherein the instructions are further operable to cause the one or more processors to perform the operations comprising:
receiving, through the spatial representation, a user interaction command for a target network element identifier; and
outputting the user interaction command to the network element associated with the target network element identifier.

18. The one or more non-transitory computer-readable media of claim 16, wherein the instructions are further operable to cause the one or more processors to perform the operations comprising:
receiving a message from a network element; and
updating the network element identifier associated with the network element to display the message within the spatial representation.

19. The one or more non-transitory computer-readable media of claim 16, wherein the instructions are further operable to cause the one or more processors to perform the operations comprising:
determining that one or more users are present within the subscriber premise based upon an identification of a wireless communication received from a client device associated with the one or more users; and
updating the spatial representation to include a user identifier associated with each of the one or more users that are determined to be present within the subscriber premise.

20. The one or more non-transitory computer-readable media of claim 16, wherein the instructions are further operable to cause the one or more processors to perform the operations comprising:
outputting a content window along with the spatial representation, wherein the content window comprises a display of a video feed.

* * * * *